United States Patent
Bifulco et al.

(10) Patent No.: US 10,892,953 B2
(45) Date of Patent: Jan. 12, 2021

(54) NETWORK-BASED APPLICATION ACCELERATION

(71) Applicant: NEC Laboratories Europe GmbH, Heidelberg (DE)

(72) Inventors: Roberto Bifulco, Heidelberg (DE); Giuseppe Siracusano, Heidelberg (DE); Davide Sanvito, Carugate (IT)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/283,855

(22) Filed: Feb. 25, 2019

(65) Prior Publication Data
US 2019/0268241 A1    Aug. 29, 2019

Related U.S. Application Data

(60) Provisional application No. 62/634,214, filed on Feb. 23, 2018.

(51) Int. Cl.
*H04L 12/24*  (2006.01)
*H04L 12/803*  (2013.01)
(Continued)

(52) U.S. Cl.
CPC .............. *H04L 41/16* (2013.01); *G06F 16/27* (2019.01); *G06N 3/08* (2013.01); *H04L 41/0803* (2013.01);
(Continued)

(58) Field of Classification Search
CPC . H04L 41/16; H04L 41/0803; H04L 41/0853; H04L 41/125; H04L 41/0813;
(Continued)

(56) References Cited

U.S. PATENT DOCUMENTS 9,800,608 B2 * 10/2017 Korsunsky .......... H04L 63/1483
10,235,625 B1 * 3/2019 Walters .................... G06N 3/04
(Continued)

FOREIGN PATENT DOCUMENTS

CN      106372402 A  *  2/2017

OTHER PUBLICATIONS

Bosshart, et al., "Forwarding Metamorphosis: Fast Programmable Match-Action Processing in Hardware for SDN," N/A (Aug. 12-16, 2013).
(Continued)

*Primary Examiner* — Uzma Alam
(74) *Attorney, Agent, or Firm* — Leydig. Voit & Mayer, Ltd.

(57) ABSTRACT

A method for load balancing in a computer network includes receiving application information for an application and information relating to an artificial neural network (NN) computation to be executed by the application. A configuration is derived for one or more network devices based on the application information and the information relating to the NN computation. The configuration is installed in the one or more network devices such that at least one of the network devices on a path of a network packet performs a subset of the NN computation and encodes a result of the subset of the NN computation into a header of the network packet.

15 Claims, 5 Drawing Sheets

(51) Int. Cl.
  *G06F 16/24*  (2019.01)
  *G06N 3/08*  (2006.01)
  *G06F 16/27*  (2019.01)
(52) U.S. Cl.
  CPC ...... *H04L 41/0813* (2013.01); *H04L 41/0853* (2013.01); *H04L 47/125* (2013.01)
(58) Field of Classification Search
  CPC ........ G06N 3/08; G06N 3/0454; G06N 3/063; G06F 16/27; G06F 9/5027; G06F 16/24568
  See application file for complete search history.

(56) References Cited

U.S. PATENT DOCUMENTS

| | | | |
|---|---|---|---|
| 10,783,433 B1* | 9/2020 | Proshin | G06N 3/08 |
| 2015/0324686 A1* | 11/2015 | Julian | G06N 20/00 706/25 |
| 2017/0161439 A1* | 6/2017 | Raduchel | G06F 16/24578 |
| 2018/0046914 A1* | 2/2018 | Li | G06N 3/082 |
| 2018/0287903 A1* | 10/2018 | Joshi | H04L 67/10 |
| 2018/0293057 A1* | 10/2018 | Sun | G06N 3/105 |
| 2018/0349769 A1* | 12/2018 | Mankovskii | G06F 16/219 |
| 2019/0356564 A1* | 11/2019 | Kaneko | H04L 43/062 |
| 2019/0379605 A1* | 12/2019 | Pfister | H04L 41/14 |
| 2019/0391850 A1* | 12/2019 | Malaya | G06F 9/505 |

OTHER PUBLICATIONS

Kraska, et al., "The Case for Learned Index Structures," N/A (Apr. 30, 2018).

Courbariaux, et al., "Binarized Neural Networks: Training Neural Networks with Weights and Activations Constrained to +1 or −1," N/A, (Mar. 17, 2016).

* cited by examiner

NETWORK-BASED APPLICATION ACCELERATION

CROSS-REFERENCE TO PRIOR APPLICATION

Priority is claimed to U.S. Provisional Patent Application No. 62/634,214 filed on Feb. 23, 2018, the entire contents of which is hereby incorporated by reference herein.

FIELD

The present invention relates to load balancing in computer networks, and in particular, to the implementation of pre-processing of calculations in network devices on a path of a network request such that servers executing an application can reduce their load.

BACKGROUND

Network devices, such as switches and routers, process data at rates of terabits per second, forwarding billions of network packets per second. Recently, the switching chips of such network devices have been enhanced to support new levels of programmability. Leveraging these new capabilities, the packet classification and modification tasks of the switching chips can now be adapted to implement custom functions. For example, researchers have proposed approaches that rethink load balancers, key-value stores and consensus protocol operations. In general, there is a trend to offload to the switching chips parts of functions typically implemented in commodity servers, thereby achieving new levels of performance and scalability.

These solutions often offload some data classification tasks, encoding relevant information, e.g., the key of a key-value store entry, in the headers of network packets. Unlike the payloads of the network packets, values in the headers can be parsed and processed by the switching chips, which perform classification using lookup tables. While providing high throughput, lookup tables need to be filled with entries that enumerate the set of values used to classify packets, and therefore the table's size directly correlates to the ability to classify a large number of patterns. It is difficult to increase the amount of memory used for the tables, since it is the main cost factor in a network device's switching chip, accounting for more than half of the chip's silicon resources.

SUMMARY

In an embodiment, the present invention provides a method for load balancing in a computer network. Application information for an application and information relating to an artificial neural network (NN) computation to be executed by the application is received. A configuration is derived for one or more network devices based on the application information and the information relating to the NN computation. The configuration is installed in the one or more network devices such that at least one of the network devices on a path of a network packet performs a subset of the NN computation and encodes a result of the subset of the NN computation into a header of the network packet.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
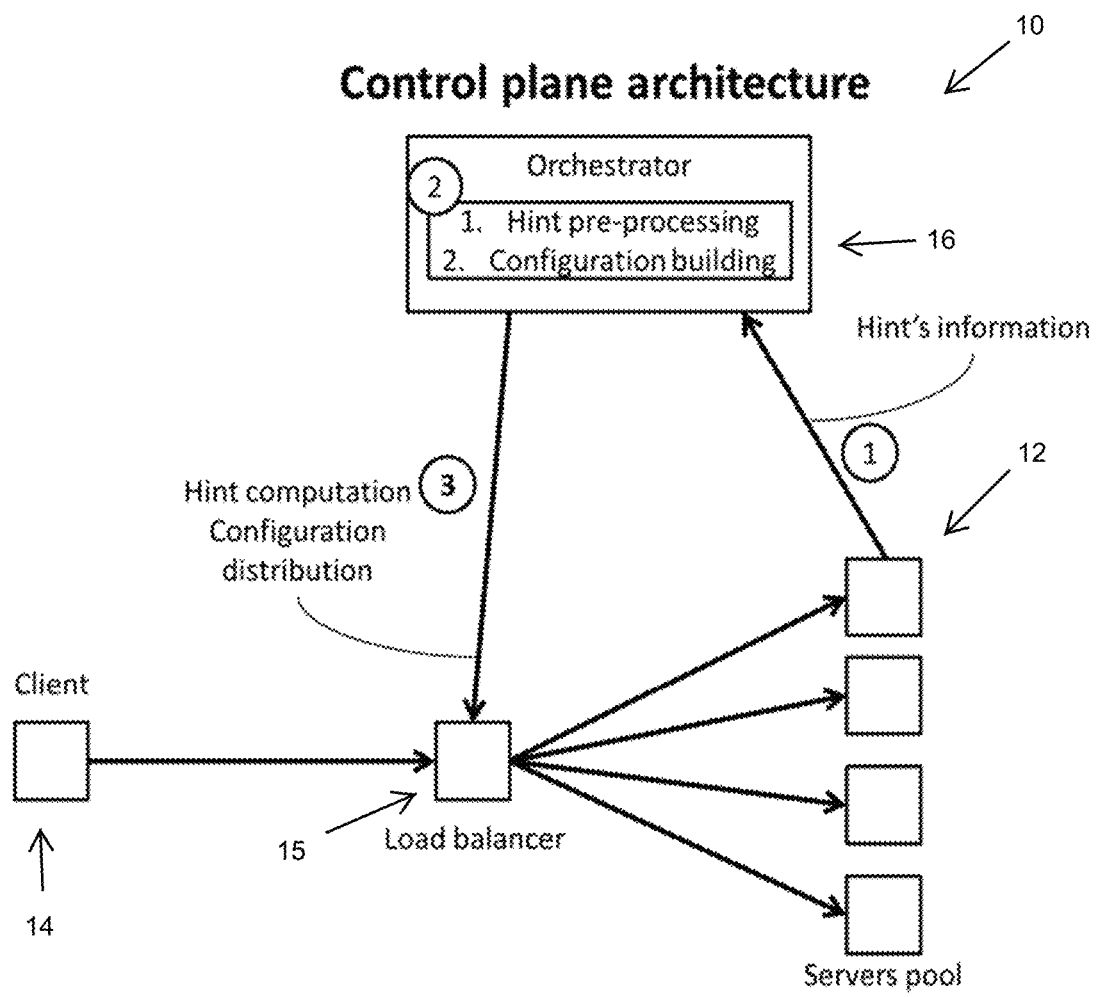
FIG. 1 is a schematic system overview of a control plane architecture according to an embodiment of the present invention.

Embodiments of the present invention provide a system and a method to perform load balancing by using the result of a neural network (NN) executed directly in the network devices, thereby selecting the best suited server to process a given request.

Embodiments of the present invention provide a system and a method to reduce the computation cost on servers and to improve the effectiveness of load distribution, by using information about the executed application's computation and the application's data to perform part of the application's computation on programmable network devices.

Embodiments of the present invention relate to a client-server application scenario, e.g., as typically implemented by datacenter applications. Requests sent by clients are dispatched to multiple servers to balance the load, provide scalability and increase performance. Each server replica performs a set of operations to provide the requested information to the client.

According to an embodiment, the present invention provides method for load balancing in a computer network. Application information for an application and information relating to an artificial neural network (NN) computation to be executed by the application is received. A configuration is derived for one or more network devices based on the application information and the information relating to the NN computation. The configuration is installed in the one or more network devices such that at least one of the network devices on a path of a network packet performs a subset of the NN computation and encodes a result of the subset of the NN computation into a header of the network packet.

According to the same or other embodiment, the method further comprises extracting, by a server executing the application, the result of the subset of the NN computation from the header of the network packet.

According to the same or other embodiment, a modified version of the application is run by a server executing the application, and the modified version reads from the header of the network packet to obtain the result of the subset of the NN computation for rebuilding the complete NN computation at reduced regular computation.

According to the same or other embodiment, a server for executing the application is selected based on the result of the subset of the NN computation.

According to the same or other embodiment, the application information is encoded into the header of the network packet.

According to the same or other embodiment, the configuration is installed on a switching chip of the network device such that the switching chip parses the header of the after the network packet is received by the switching chip and performs the subset of the NN computation using match-action tables.

According to the same or other embodiment, the application is a key-value store distributed application, and wherein the configuration is installed on the one or more network devices such that the one or more network devices parse key information of a key according to a packet format of the network packet. In this case, the result of the subset of the NN computation is a prediction of an index containing a value relating to the key.

According to the same or other embodiment, the configuration is based on a binary NN model which uses bitwise logic functions.

According to another embodiment, the present invention provides an orchestrator comprising memory and one or more processors which, alone or in combination, are configured to provide for execution of a method comprising: receiving application information for an application and information relating to an artificial neural network (NN) computation to be executed by the application; deriving, based on the application information and the information relating to the NN computation, a configuration for one or more network devices; and installing the configuration in the one or more network devices such that at least one of the network devices on a path of a network packet performs a subset of the NN computation and encodes a result of the subset of the NN computation into a header of the network packet. According to the same or other embodiment, the result of the subset of the NN computation is useable for selecting a server for executing the application. According to the same or other embodiment, the application information is encoded into the header of the network packet.

According to the same or other embodiment, the configuration is based on a binary NN model which uses bitwise logic functions.

According to a further embodiment, the present invention provides a tangible, non-transitory computer-readable medium having instructions thereon, which, upon execution by one or more processors with memory, provide for execution of a method comprising: receiving application information for an application and information relating to an artificial neural network (NN) computation to be executed by the application; deriving, based on the application information and the information relating to the NN computation, a configuration for one or more network devices; and installing the configuration in the one or more network devices such that at least one of the network devices on a path of a network packet performs a subset of the NN computation and encodes a result of the subset of the NN computation into a header of the network packet. According to the same or other embodiment, the application information is encoded into the header of the network packet.

The variability in workloads could lead to the overloading of the servers' resources. The situation can get worse when the load balancing logic is completely agnostic on the application. If, for example, the load balancer simply chooses a destination server using an Equal-Cost Multi-Path (ECMP) strategy based on flow hashing, it might split traffic in a non-uniform fashion in case multiple heavy requests collided onto the same server. A possible solution would be to employ very expensive and inflexible advanced hardware load balancers, which continuously monitor the status of the servers to dynamically balance the load. In some other cases, providing load balancing is complex since the cost of executing a client's request on the server is variable. For instance, this is the case of database systems that need to retrieve data from a large data store, in case caching strategies are ineffective, e.g., for some data intelligence applications. When data has to be retrieved, if there is a cached value, the server can quickly generate the response, otherwise the server has to seek the location of the data in order to retrieve it, which usually requires traversing some index structure before finally retrieving the data.

The inventors have recognized that the performance of the overall network and system would be improved from using more complex load balancers that adapt the load balancing strategy depending on the actual workload. At the same time, embodiments of the present invention provide that the system has a simplified management and reduced cost where the introduction of custom dedicated load balancers would be avoided. Embodiments of the present invention provide one or both of the foregoing improvements at the same time.

Programmable switching chips of network devices allow to define a custom packet header format and to execute, in addition to pure forwarding, some arithmetical and logical operations at line-rate on the packet header while processing the packets. A network device is in a privileged position to perform in-path computation, replacing regular load balancers, since it is already on the network path.

By performing the right computation on the switching chip, it is possible to anticipate (completely or partially) the set of common operations executed by the servers, before requests actually reach the servers themselves. The amount of delegated operations depends on the availability of resources in terms of memory and arithmetic logic unit (ALU) on the network devices.

In this way, the switching chips of network devices are not just in charge of forwarding packet and load balance information toward the servers, but also assist in performing the computation, thereby (partially) relieving the servers. Furthermore, the pre-computation result could be used to provide important properties about the workload, and could also be used to define a load balancing policy. Based on current switching chip technology, this pre-computation can only be performed over information contained in packet header fields, since that is the only part of the packet accessible to a programmable network device. Also, the intermediate results obtained through the pre-computation are stored again in the same packet headers, so that the server can use this information as a starting point to complete the overall computation.

FIG. 1 illustrates a control plane architecture of a system 10 according to an embodiment of the present invention. A pool of servers 12 handles requests coming from one or more clients 14. Requests are split towards different server instances by a load balancing node 15, implemented by a programmable switch, which may be one of the already deployed network infrastructure's devices. For example, the load balancing node 15 can be a switching chip of a network device, which can also be referred to as a programmable or network switch.

The orchestrator 16 is in charge of configuring the load balancing node 15, according to the workload properties and to the type of computation performed by the servers 12, in order to: (i) implement the load balancing logic to properly distribute requests, and (ii) execute the pre-processing stage on the data. The orchestrator 16 can be a node on the network. The orchestrator includes one or more computational processors and memory for performing the hint pre-processing and the configuration building.

With reference to FIG. 1, the overall system 10 is configured during a setup phase that includes: recovering workload and computation information (1), defining and building the load balancing logic and the configuration for the pre-processing stage (2), and the configuration of the switching chips of network devices (3).

Bosshart, Pat et al., "Forwarding Metamorphosis: Fast Programmable Match-Action Processing in Hardware for SDN," ACM, SIGCOMM '13, New York, N.Y., pp. 99-110 (2013), which is hereby incorporated by reference herein, describes that recent programmable switches allow for the definition of custom packet formats: a network operator can re-purpose switching chips of network devices to handle different protocols (standard or brand new one) by specifying the header format of the packets the switch will have to deal with. Once the switch has a notion of packet fields, it can be configured, e.g., via a match-action table abstraction, to execute a given set of actions. Also the actions are user-defined and are built by combining action primitives offered by the switch: these includes selecting an output port, dropping the packet or modifying packet header fields by means of arithmetic or logic operations.

Figure 2:
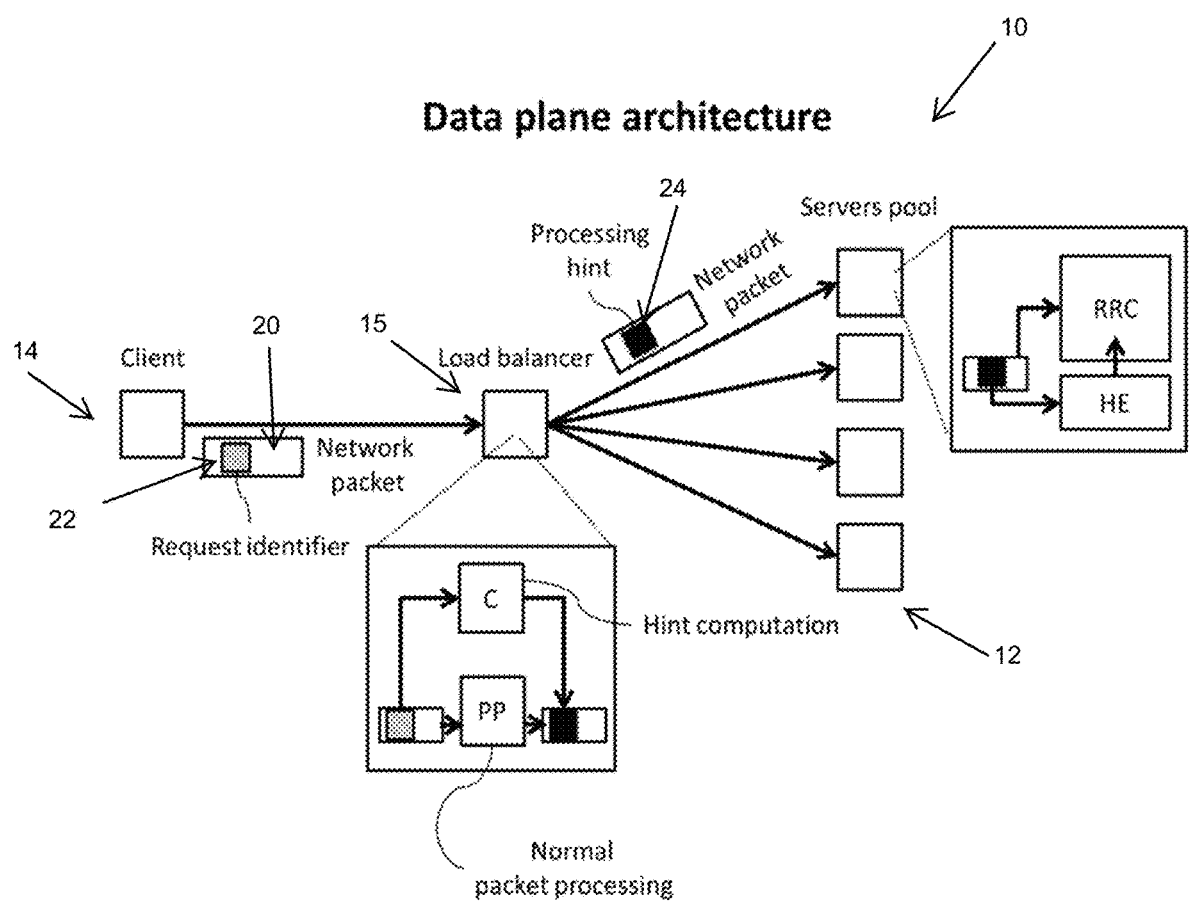
FIG. 2 is a schematic system overview of a data plane architecture according to an embodiment of the present invention.

FIG. 2 illustrates a data plane architecture of the system 10 according to an embodiment of the present invention. The capabilities of the programmable switch of the load balancing node 15 are used according to embodiments of the present invention to parse custom packet fields of network packets 20 which include application-specific information such as a request identifier 22. The load balancing node 15 can thus not only execute standard packet processing PP to forward it to one server replica of the pool of servers 12, but also performs the hint computation C whose output is stored in the packet itself as a processing hint 24 and can be re-used by the server to complete the set of operations required to fulfill client request. The hint computation is configured by the orchestrator 16 during the step (3) of the setup phase discussed above (see FIG. 1). Each server is thereby effectively executing only a subset of its operations, or reduced regular computation RRC, thanks to the partial computation executed by the network chip of the network device and made available through the packet itself hint extraction HE.

Considering a key-value store distributed application according to an embodiment of the present invention, each server replica can hold a portion of the database and multiple servers can hold a copy of a same portion to guarantee failure resiliency and an higher system throughput. In this context, the orchestrator 16 needs to configure the load balancing node 15 to be able to parse requests (in particular the "key" information) according the packet format adopted in the client-server communication. The load balancing in this case needs to select a server replica of the pool of servers 12 among the subset responsible for the portion including the requested key.

Figure 3:
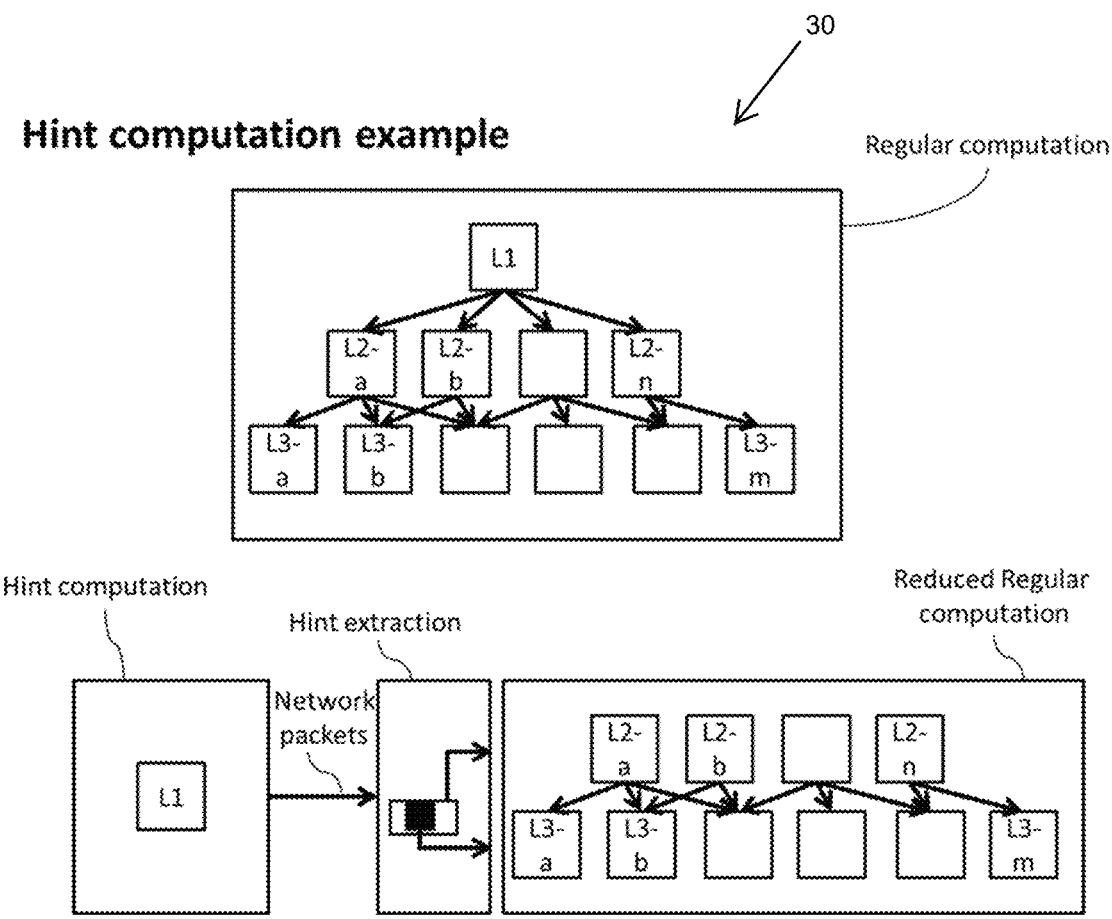
FIG. 3 illustrates a hint computation for providing a reduced regular computation according to an embodiment of the present invention.

According to an embodiment, the hint computation builds on Kraska, Tim, et al., "The Case for Learned Index Structures," arXiv: 1712.01208v2 (Dec. 11, 2017), which is hereby incorporated by reference herein and proposes to replace index structures commonly used in data management systems (such as B-Trees, Hash-Maps and Bloom-filters) with other types of models based on the data distribution, including NNs. In particular, it is proposed to replace index structures with a hierarchy of models (see top of FIG. 3), where the first node takes the key as input and at each level the next model is selected according to the output of the model, up to the last stage, where the output is the prediction of the index containing the value related to the key. FIG. 3 illustrates a hint computation 30 according to an embodiment of the present invention.

Some of these models are implemented by NNs and recent works such as Courbariaux, Matthieu et al., "Binarized Neural Networks: Training Neural Networks with Weights and Activations Constrained to +1 or −1," arXiv: 1602.02830v3 (Mar. 17, 2016), which is hereby incorporated by reference herein, showed that it is possible to approximate them by using a simpler set of operations. This arithmetic and logical operation are well suitable for execution of a switching chip, which is much less powerful and flexible than general purpose processors, but is highly optimized for simple operations. In addition, the hierarchical nature of the approach makes the anticipation of a portion of the operations on-path (i.e. before reaching the server) an appealing solution to reduce the computation executed on each server by exploiting the line-rate computation capabilities of a node that in any case has to process the packets towards the server and at the same time might try to reduce the amount of operations executed by the servers.

In effect, by leveraging the hierarchical structure in the computation, embodiments of the present invention provide to perform parts of the required computation steps already while forwarding the network packets that will trigger such computation on the server. Advantageously, these computations are common to all the servers, which enables the switching chip to perform them in advance, no matter which server is selected by the eventual load balancing logic. Furthermore, the pre-computation can provide important information about which server is best suited to complete the computation started in the switching chip. Thus, the pre-computation both reduces the actual load on the servers and can be used to select a more suitable load balancing mechanism.

Embodiments of the present invention provide for the following improvements:

1) The ability to provide application data properties and a portion of the artificial NN computation to be executed by the application to a central orchestrator, in order to derive a network configuration that performs a subset of the computation in the network devices. The result of the NN computation's subset performed in the network device can also be used to derive the device's load balancing policy.

2) The encoding of the result of the subset of the computation in a network packet header allows to make use of it in the destination server as a starting point for further computation.

3) The reduction of the overall load of the computer network infrastructure.

4) Overall improved network resource utilization by improved load balancing.

According to an embodiment, a method for load balancing in a computer network comprises the following steps:

1) The application's information and the computation performed by the application are provided as information to the orchestration system.

2) The orchestration system uses the above information from step 1) to derive network devices configurations and install them in the network devices.

3) The servers executing the application run a modified version of the original application, which is prepared to perform a subset of the overall computation. Also, the modified version reads from the received network packets' headers the information generated by the network devices and that is required to rebuild the overall application computation.

4) When sending a request for the servers, the client encodes information about the request in the packet header that is sent on the network towards the servers.

5) The network device on the path receives the packet, and performs the configured pre-computation in the data plane, whose result is encoded in the packet header that is sent towards the destination server. In some further advantageous embodiments, the pre-computation result is used to decide to which destination server the packet should be send.

6) The server receives the packet, extracts the pre-computation result from it and executes the remaining part of the application's computation.

In the following, particular embodiments of the invention are described in which a N2Net network to run NNs on a switching chip of a network device is implemented. An artificial NN model is used as a classifier in a switching chip, as a complement to existing lookup tables. A NN can better fit the data at hand, which can reduce memory requirements at the cost of extra computation. However, since adding circuitry to perform computation is much more efficient and less expensive than adding memory, the computational resources of the network are more effectively used even if some additional computation is needed. For reference, in a programmable switching chip, the entire set of computations is implemented using less than a tenth of the overall chip's area.

It was recognized in accordance with embodiments of the present invention that a modern switching chip is already provided with the primitives required to implement the forward pass of quantized models such as BNNs, and that performing such computation is feasible at packets processing speeds. Embodiments of the present invention provide an approach to efficiently leverage the device parallelism to implement such models. An embodiment of the present invention provides a compiler that, given a NN model, automatically generates the switching chip's configuration that implements it. It has been demonstrated in embodiments of the present invention that current switching chips can run simple NN models, and that with little additions, a chip design could easily support more complex models, thereby addressing a larger set of applications.

According to a particular embodiment, a NN classifier can be used to implement packet classification inside the chip, e.g., to create large white/blacklist indexes for Denial of Service protection. According to other embodiments, the outcome of the NN classification can be encoded in the packet header and used in an end-to-end system to provide "hints" to a more complex processor located in a server, e.g., on how to handle the packet's payload to optimize data locality/cache coherency or to perform or support load balancing, such as in the embodiments described above.

Figure 4:
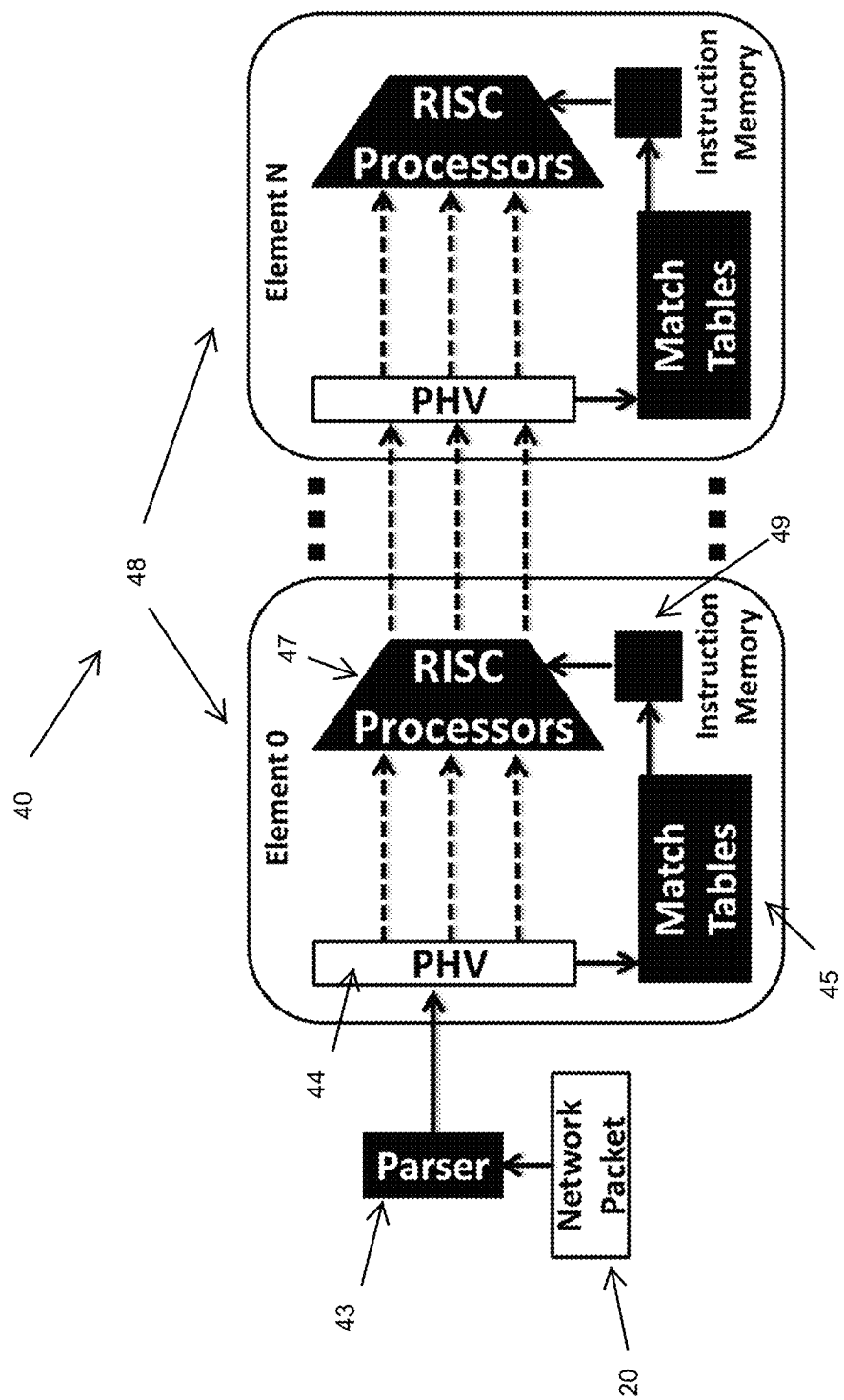
FIG. 4 is a schematic view of a switching chip's pipeline.

Switching chips process network packets to take a forwarding decision, e.g., forward to a given port or drop. They also perform transformations to the packet header values, e.g., to decrement a time-to-live field. The reconfigurable match tables (RMT) model was used as a representative model of state-of-the-art switching chips. FIG. 4 schematically illustrates the pipeline of an RMT switching chip 40. When a network packet 20 is received, a parser 43 of the RMT switching chip 40 parses several 100s bytes of its header to extract protocol fields' values, e.g., IP addresses. These values are written to a packet header vector (PHV) 44 that is then processed by a pipeline of elements 48 that implement match-action tables 45. Each element 48 has a limited amount of memory to implement lookup tables (the match part), and hundreds of reduced instruction set computer (RISC) processors 47 that can read and modify the PHV 44 in parallel (the action part). The values in the PHV 44 are used to perform table lookups and retrieve the instructions the RISC processors 47 should apply from an instruction memory 49. To provide very high performance, these RISC processors 47 implement only simple operations, such as bitwise logic, shifts and simple arithmetic (e.g., increment, sum). Using a language such as P4, the RMT switching chip 40 can be programmed to define the logic of the parser 43 and the actions performed on the PHV 44. In particular, the actions can be defined as a combination of the simpler primitives mentioned earlier.

The limited set of arithmetic functions supported by the RMT switching chip 40 does not enable the implementation of the multiplications and activation functions usually required by a NN. However, simplified models designed for application in resource-limited embedded devices, such as binary neural networks (BNNs), do not require such complex arithmetic, especially during the forward pass. According to embodiments of the present invention, it is therefore advantageous to provide that models are selected that only use bitwise logic functions, such as XNOR, the Hamming weight computation (POPCNT), and the SIGN function as the activation function.

Figure 5:
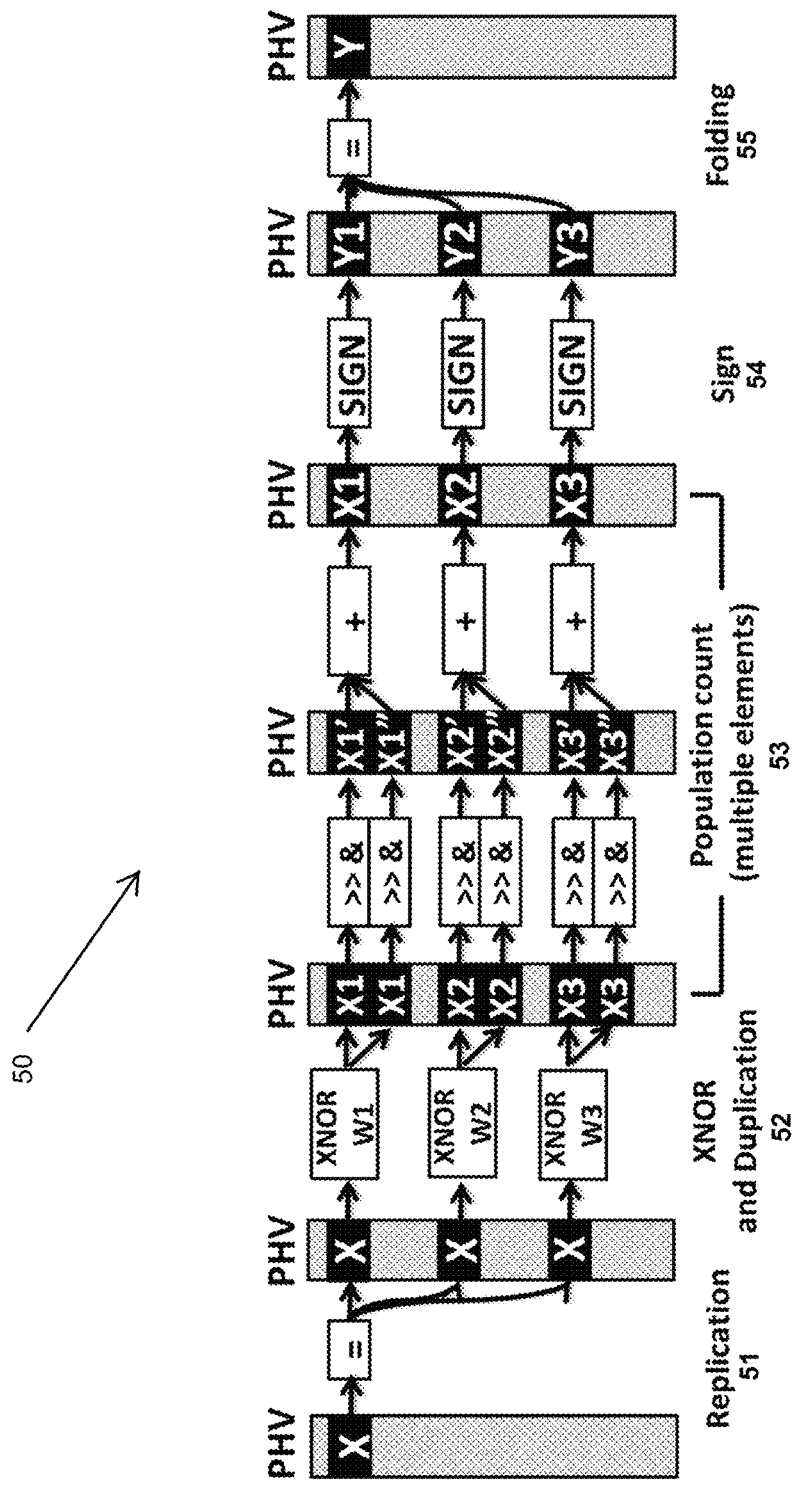
FIG. 5 shows an implementation of a three neurons binary neural network (BNN) processing.

N2Net implements the forward pass of a BNN, and assumes that the BNN activations are encoded in a portion of the packet header. The header is parsed as soon as a packet is received, and the parsed activations vector is placed in a PHV's field. FIG. 5 illustrates the operations 50 performed by N2Net to implement a 3 neurons BNN. The entire process comprises five steps:

S1) Replication: In the first step, the activations are replicated in the destination PHV as many times as the number of neurons that should be processed in parallel.

S2) XNOR and Duplication: In the second step, the fields are processed by the element's RISC processors. The applied actions perform XNOR operations on the activations taking as parameters the neurons' weights. The results are stored twice in the destination PHV. This duplication is required by the implementation of the POPCNT as explained next.

S3) POPCNT: RMT does not support a POPCNT primitive operation. A naive implementation using an unrolled for cycle that counts over the vector bits may require a potentially large number of elements. Instead, according to an embodiment of the present invention, in the third step, an existing algorithm is adapted that counts the number of 1 bits performing additions of partial counts in a tree pattern. The advantage of this algorithm is that it can perform some computations in parallel, while using only shifts, bitwise logic and arithmetic sums. N2Net implements the algorithm combining two pipeline's elements. The first element performs shift/bitwise AND in parallel on the two copies of the input vector. Each copy contains the mutually independent leaves of the algorithm's tree structure. The second element performs the SUM on the outcome of the previous operations. Depending on the length of the activation vector, there may be one or more groups of these two elements, in which case the sum's result is again duplicated in two destination PHV's fields.

S4) SIGN: The fourth step implements the sign operation verifying that the POPCNT result is equal to or greater than half the length of the activations vector. The result is a single bit stored in the least significant bit of the destination PHV's field.

S5) Folding: the last step folds together the bits resulting from the SIGN operations to build the final Y vector, which can be used as input for a next sequence of the steps S1-S5.

N2Net currently implements fully-connected BNNs taking a model description (number of layers, neurons per layer) and creating a P4 description that modifies/replicates the above steps S1-S5 as needed. BNNs are relatively small models whose weights fit in the pipeline element's static random-access memory (SRAM). The weights can be pre-configured.

The implementation of an embodiment of the invention for evaluation was subject to two main constraints. First, the PHV was 512B long. Since the PHV was used to store the BNN input, the maximum activation vector length is 2048 (i.e., half the PHV's size, 256B, since the duplication step was performed in S2). Smaller activation vectors enable the parallel execution of multiple neurons, using the replication step S1. For example, with a 32b activation vector, up to 64 neurons can be processed in parallel. Second, the RMT pipeline has 32 elements, and each element can only perform one operation on each of the PHV's fields (for a maximum of 224 parallel operations on independent fields in each element). While the POPCNT leveraging parallelism was implemented in order to minimize the number of required elements, 3+2 log 2(N) elements were still needed to implement a single neuron, where N is the size of the activations vector. Using the previous examples, the execution of a neuron with 2048 activations would require 25 elements, while with a 32b activations vector, just 13 elements are required. Furthermore, in this last case the addition of the replication step S1 (i.e., an additional element) would correspond to the parallel execution of up to 64 neurons using only 14 out of the 32 pipeline elements.

Table 1 below shows the maximum number of parallel neurons and the required number of elements for different activations vector sizes.

TABLE 1

| Activations (bits) | 16 | 32 | 64 | 128 | 256 | 512 | 1024 | 2048 |
|---|---|---|---|---|---|---|---|---|
| Parallel neur. (max) | 128 | 64 | 32 | 16 | 8 | 4 | 2 | 1 |
| Elements number | 12 | 14 | 16 | 18 | 20 | 22 | 24 | 25 |

In terms of throughput, an RMT pipeline can process 960 million packets per second. Since the activations were encodes in one packet, N2Net enables the processing of 960 million neurons per second, when using 2048b activations. Processing smaller activations enables higher throughput because of parallel processing.

To put this in perspective, considering the above constraints, it is possible in accordance with an embodiment of the present invention to run about a billion small BNNs per second, i.e., one for each received packet. For instance, it would be possible to run 960 million two-layers—BNNs per second, using 32b activations (e.g., the destination IP address of the packet), and two layers of 64 and 32 neurons.

N2Net shows that BNN models can be implemented with already available switching chip technology. To provide for increased NN model complexity and provide for further applications, embodiments of the present invention also provide for improved switching chip technology and allow switching chips to support NN models with only relatively inexpensive design changes. For example, implementing a simple POPCNT primitive on 32b operands requires few additional logic gates, but could significantly reduce the number of required pipeline elements. In other words, this would change the 12-25 elements range of Table 1 to a 5-10 elements range. Also, this removes the need for the duplication step S2, immediately doubling the available space in the PHV, hence doubling the neurons executed in parallel.

Furthermore, the circuitry dedicated to computation (including parsers) accounts for less than 10% of the switching chip's area. Using 5-10 pipeline elements to implement BNN computations takes less than a third of that circuitry. Thus, adding a dedicated circuitry for the execution of BNN computations is likely to account for less than a 3-5% increase in the overall chip area costs.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for load balancing in a computer network, the method comprising:
   receiving application information for an application and information relating to an artificial neural network (NN) computation to be executed by the application;
   deriving, based on the application information and the information relating to the NN computation, a configuration for one or more network devices; and
   installing the configuration in the one or more network devices such that at least one of the network devices on a path of a network packet performs a subset of the NN computation and encodes a result of the subset of the NN computation into a header of the network packet.

2. The method according to claim 1, further comprising extracting, by a server executing the application, the result of the subset of the NN computation from the header of the network packet.

3. The method according to claim 1, wherein a modified version of the application is run by a server executing the application, and wherein the modified version reads from the header of the network packet to obtain the result of the subset of the NN computation for rebuilding the complete NN computation at reduced regular computation.

4. The method according to claim 1, wherein a server for executing the application is selected based on the result of the subset of the NN computation.

5. The method according to claim 1, wherein the application information is encoded into the header of the network packet.

6. The method according to claim 1, wherein the configuration is installed on a switching chip of the network device such that the switching chip parses the header of the network packet after the network packet is received by the switching chip and performs the subset of the NN computation using match-action tables.

7. The method according to claim 1, wherein the application is a key-value store distributed application, and wherein the configuration is installed on the one or more network devices such that the one or more network devices parse key information of a key according to a packet format of the network packet.

8. The method according to claim 7, wherein the result of the subset of the NN computation is a prediction of an index containing a value relating to the key.

9. The method according to claim 1, wherein the configuration is based on a binary NN model which uses bitwise logic functions.

10. An orchestrator comprising memory and one or more processors which, alone or in combination, are configured to provide for execution of a method comprising:
   receiving application information for an application and information relating to an artificial neural network (NN) computation to be executed by the application;
   deriving, based on the application information and the information relating to the NN computation, a configuration for one or more network devices; and
   installing the configuration in the one or more network devices such that at least one of the network devices on a path of a network packet performs a subset of the NN computation and encodes a result of the subset of the NN computation into a header of the network packet.

11. The orchestrator according to claim 10, wherein the result of the subset of the NN computation is useable for selecting a server for executing the application.

12. The orchestrator according to claim 10, wherein the application information is encoded into the header of the network packet.

13. The orchestrator according to claim 10, wherein the configuration is based on a binary NN model which uses bitwise logic functions.

14. A tangible, non-transitory computer-readable medium having instructions thereon, which, upon execution by one or more processors with memory, provide for execution of a method comprising:
   receiving application information for an application and information relating to an artificial neural network (NN) computation to be executed by the application;
   deriving, based on the application information and the information relating to the NN computation, a configuration for one or more network devices; and
   installing the configuration in the one or more network devices such that at least one of the network devices on a path of a network packet performs a subset of the NN computation and encodes a result of the subset of the NN computation into a header of the network packet.

15. The computer-readable medium according to claim 14, wherein the application information is encoded into the header of the network packet.

* * * * *